(12) United States Patent
Jang et al.

(10) Patent No.: US 7,972,571 B2
(45) Date of Patent: Jul. 5, 2011

(54) APPARATUS FOR SYNTHESIZING CARBON NANOTUBES

(75) Inventors: Suk-Won Jang, Seoul (KR); Jong-Kwan Jeon, Suwon-si (KR); Chung-Heon Jeong, Ohsan-si (KR)

(73) Assignee: Semes Co., Ltd, Cheonan-si (KR)

( * ) Notice: Subject to any disclaimer, the term of this patent is extended or adjusted under 35 U.S.C. 154(b) by 397 days.

(21) Appl. No.: 12/324,930

(22) Filed: Nov. 28, 2008

(65) Prior Publication Data

US 2010/0129275 A1 May 27, 2010

(30) Foreign Application Priority Data

Nov. 25, 2008 (KR) .................. 10-2008-0117584

(51) Int. Cl.
- *B01J 35/02* (2006.01)
- *B01J 8/02* (2006.01)
- *B01J 8/08* (2006.01)
- *B01J 19/00* (2006.01)
- *F28D 21/00* (2006.01)
- *D01F 9/12* (2006.01)

(52) U.S. Cl. ........ 422/220; 422/129; 422/202; 422/211; 422/218; 423/447.3

(58) Field of Classification Search .................. 422/129, 422/202, 211, 218, 220; 423/447.3
See application file for complete search history.

(56) References Cited

U.S. PATENT DOCUMENTS

| 5,102,647 A * | 4/1992 | Yamada et al. ............ 423/447.3 |
| 2008/0308209 A1* | 12/2008 | Loutfy et al. ................ 156/62.2 |

OTHER PUBLICATIONS

Zhu et all, Synthesis of single-walled carbon nanotubes fy the vertical floating catalyst method, Jan. 2002, Chinese Science Bulletin, vol. 47, No. 2, pp. 159-162.*

Igarashi et al, Purification and characterization of zeolite-supported single-walled carbon nanotubes catalytically synthesized from ethanol, Jul. 11, 2004, Chemical Physics Letters, vol. 392, Issues 4-6, pp. 529-532.*

* cited by examiner

*Primary Examiner* — Walter D Griffin
*Assistant Examiner* — Natasha Young
(74) *Attorney, Agent, or Firm* — Sughrue Mion, PLLC

(57) ABSTRACT

Provided is an apparatus for synthesizing carbon nanotubes (CNTs). The apparatus includes: a vertical reaction chamber; a mixer which is disposed within the vertical reaction chamber and mixes a catalyst supplied from above; and a plurality of dispersion plates which vertically partition a space inside the vertical reaction chamber into a plurality of sections and uniformly disperse a source gas, which is supplied from above, into the sections.

10 Claims, 3 Drawing Sheets

APPARATUS FOR SYNTHESIZING CARBON NANOTUBES

This application claims priority from Korean Patent Application No. 10-2008-0117584 filed on Nov. 25, 2008 in the Korean Intellectual Property Office, the disclosure of which is incorporated herein by reference in its entirety.

BACKGROUND OF THE INVENTION

1. Field of the Invention

The present invention relates to an apparatus for synthesizing carbon nanotubes (CNTs), and more particularly, to an apparatus for synthesizing CNTs, in which a fluid vertical reaction chamber includes dispersion plates that partition the vertical reaction chamber into a plurality of sections, in which a mixer causes a catalyst to free-fall through a catalyst-dropping hole of each of the dispersion plates, and in which CNTs are continuously synthesized by using the free-falling catalyst.

2. Description of the Related Art

Carbon nanotubes (CNTs) or carbon nano fibers are cylinders of carbon atoms, each being bonded to three adjacent carbon atoms to form a hexagonal ring. The hexagonal ring is repeated in a honeycomb pattern to form a graphite sheet which is rolled into a cylinder. Here, the diameter of the cylinder is a few nanometers to several hundred nanometers, and the length of the cylinder is several ten to thousand times the diameter of the cylinder.

When CNTs or carbon nano fibers have an armchair structure, they exhibit conducting properties. When CNTs or carbon nano fibers have a zigzag structure, they exhibit semiconducting properties. Besides being conducting or semiconducting, CNTs or carbon nano fibers have superior electrical properties and high mechanical strength and are chemically stable. These properties make them promising candidates for various applications of information technology.

Conventional methods of synthesizing CNTs or carbon nano fibers include arc discharge, laser ablation, vapor phase growth, thermal chemical vapor deposition (CVD), and plasma enhanced CVD (PECVD). In vapor phase growth, in particular, a substrate is not used, and a carbon source gas is pyrolyzed within a reaction chamber to synthesize CNTs in a vapor phase. This synthesis method is useful for mass production of CNTs.

SUMMARY OF THE INVENTION

Aspects of the present invention provide an apparatus for synthesizing carbon nanotubes (CNTs), in which a fluid vertical reaction chamber includes dispersion plates that partition the vertical reaction chamber into a plurality of sections, in which a mixer causes a catalyst to free-fall through a catalyst-dropping hole of each of the dispersion plates, and in which CNTs are continuously synthesized by using the free-falling catalyst.

Aspects of the present invention also provide an apparatus for synthesizing CNTs, the apparatus capable of reducing the time required to supply a catalyst and synthesize and collect CNTs and thus enhancing productivity by continuously supplying the catalyst and synthesize and collect the CNTs.

Aspects of the present invention also provide an apparatus for synthesizing CNTs, the apparatus capable of providing CNTs with consistent quality by setting conditions for a CNT synthesis process and then synthesizing a source gas into CNTs using a catalyst, which is continuously supplied, and collecting the CNTs.

Aspects of the present invention also provide an apparatus for synthesizing CNTs, the apparatus capable of preventing channeling, which occurs when particles of a catalyst are very small, by using a catalyst-dropping hole formed in each dispersion plate.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided an apparatus for synthesizing CNTs. The apparatus includes: a vertical reaction chamber; a mixer which is disposed within the vertical reaction chamber and mixes a catalyst supplied from above; and a plurality of dispersion plates which vertically partition a space inside the vertical reaction chamber into a plurality of sections and uniformly disperse a source gas, which is supplied from above, into the sections.

Each of the dispersion plates may include a plurality of through-holes, through which the source gas passes, and a catalyst-dropping hole extending from a center thereof, through which a shaft of the mixer penetrates, to an edge thereof.

The dispersion plates may be alternately installed such that the catalyst-dropping holes are at 180 degrees to each other within the vertical reaction chamber.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
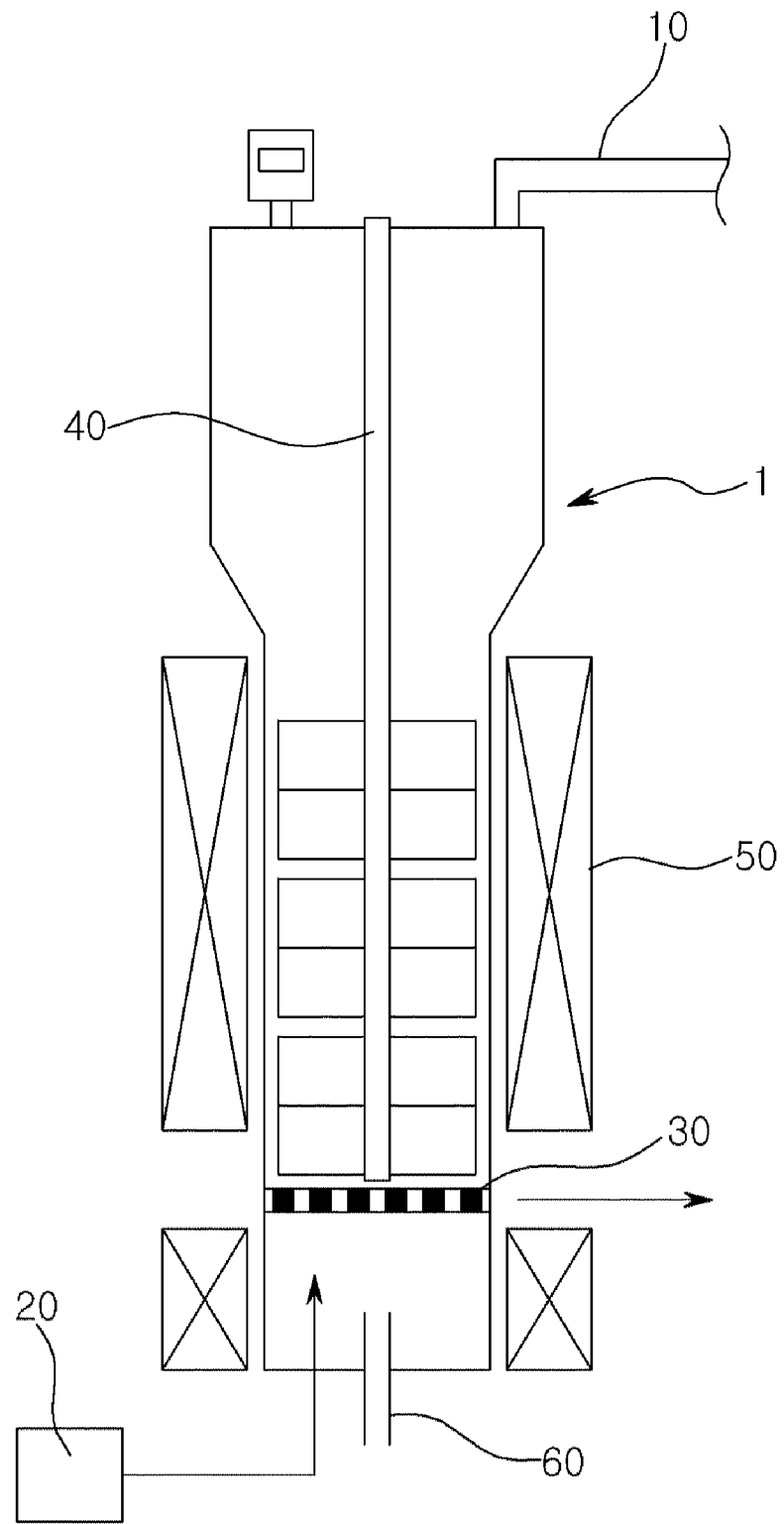
FIG. 1 is a schematic diagram of a conventional apparatus for synthesizing carbon nanotubes (CNTs)

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

It will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Like numbers refer to like elements throughout. As used herein, the term "and/or" includes any and all combinations of one or more of the associated listed items.

It will be understood that, although the terms first, second, third, etc., may be used herein to describe various elements, components and/or sections, these elements, components and/or sections should not be limited by these terms. These terms are only used to distinguish one element, component or section from another element, component or section. Thus, a first element, component or section discussed below could be termed a second element, component or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in more detail with reference to the attached drawings.

FIG. 1 is a schematic diagram of a conventional apparatus for synthesizing carbon nanotubes (CNTs). Referring to FIG. 1, the conventional apparatus includes a catalyst supplier 10, a gas supplier 20, a dispersion plate 30, a mixer 40, heaters 50, and a collector 60.

The catalyst supplier 10 supplies a catalyst into a vertical reaction chamber 1 from above the vertical reaction chamber 1. The gas supplier 20 supplies a source gas into the vertical reaction chamber 1 from under the vertical reaction chamber 1. The dispersion plate 30 is disposed within the vertical reaction chamber 1 and uniformly disperses the source gas into the vertical reaction chamber 1. The mixer 40 is disposed within the vertical reaction chamber 1 and mixes the catalyst supplied from above. The heaters 50 are disposed outside the vertical reaction chamber 1 and heat the vertical reaction chamber 1 so that the source gas is pyrolyzed and then synthesized into CNTs within the vertical reaction chamber 1. The collector 60 is disposed under or on an end of the dispersion plate 30 and collects the synthesized CNTs.

The conventional apparatus performs a CNT synthesis process once for a predetermined amount of catalyst supplied by the catalyst supplier 10. That is, the conventional apparatus sets an amount of source gas, which corresponds to a predetermined amount of catalyst that is supplied, and a temperature to which the vertical reaction chamber 1 is to be heated by the heaters 50. Then, the conventional apparatus synthesizes CNTs by using the predetermined amount of catalyst and collects the synthesized CNTs. In this state, if the conventional apparatus is to synthesize CNTs again, it must set conditions for the CNT synthesis process again. Therefore, a lot of time is required to perform the CNT synthesis process again. In addition, if different conditions are set for each CNT synthesis process, the consistent quality of CNTs, which are collected, cannot be guaranteed.

When CNTs are synthesized as described above, a lot of time is required to supply a catalyst, synthesize CNTs by using the catalyst, and collect the synthesized CNTs. Consequently, productivity is undermined. In particular, when the particle size of the catalyst is about the size of Geldart A particles, holes, which are formed in the dispersion plate 30 and through which the source gas passes, may be clogged with the catalyst, thereby causing, e.g., channeling.

In this regard, an apparatus, which can provide CNTs with consistent quality and at constant productivity by continuously synthesizing and collecting the CNTs, is required.

Figure 2:
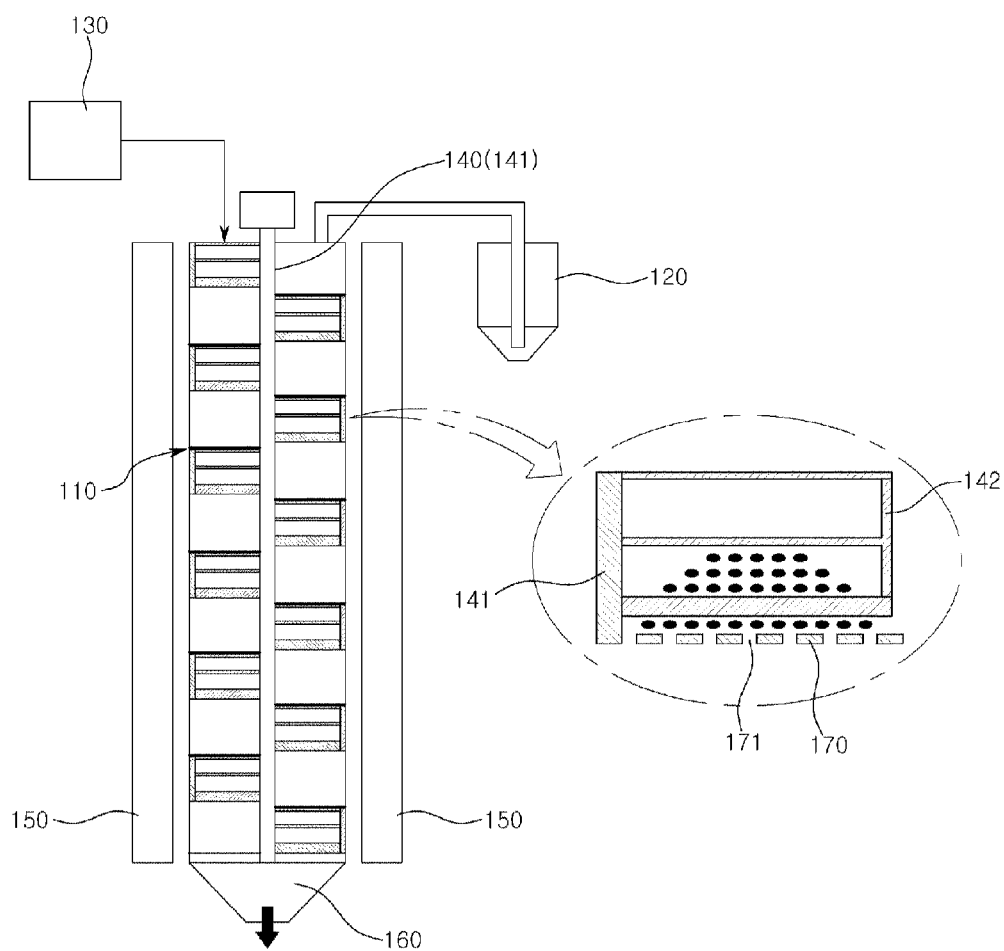
FIG. 2 is a schematic lateral cross-sectional view of an apparatus for synthesizing CNTs according to an exemplary embodiment of the present invention.
Figure 3:
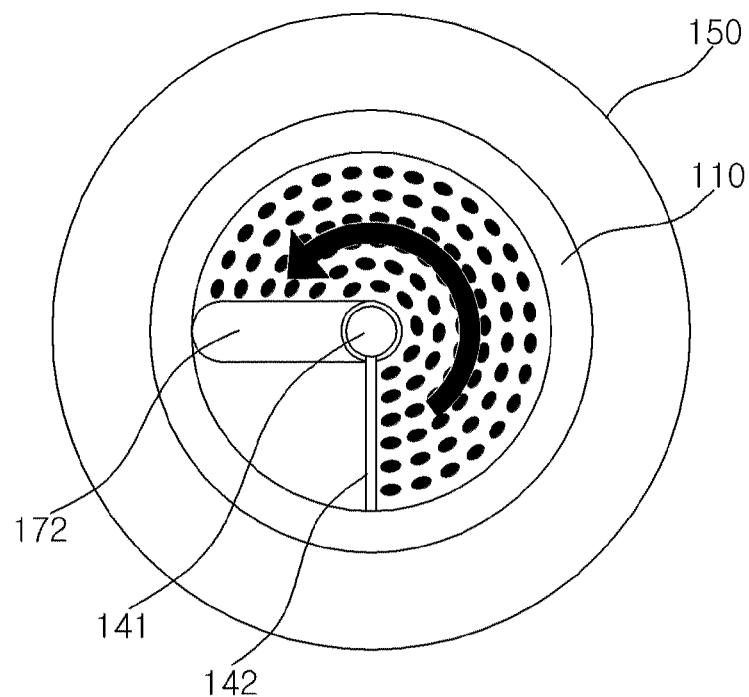
FIG. 3 is a schematic top cross-sectional view of the apparatus of FIG. 2.
Figure 4:
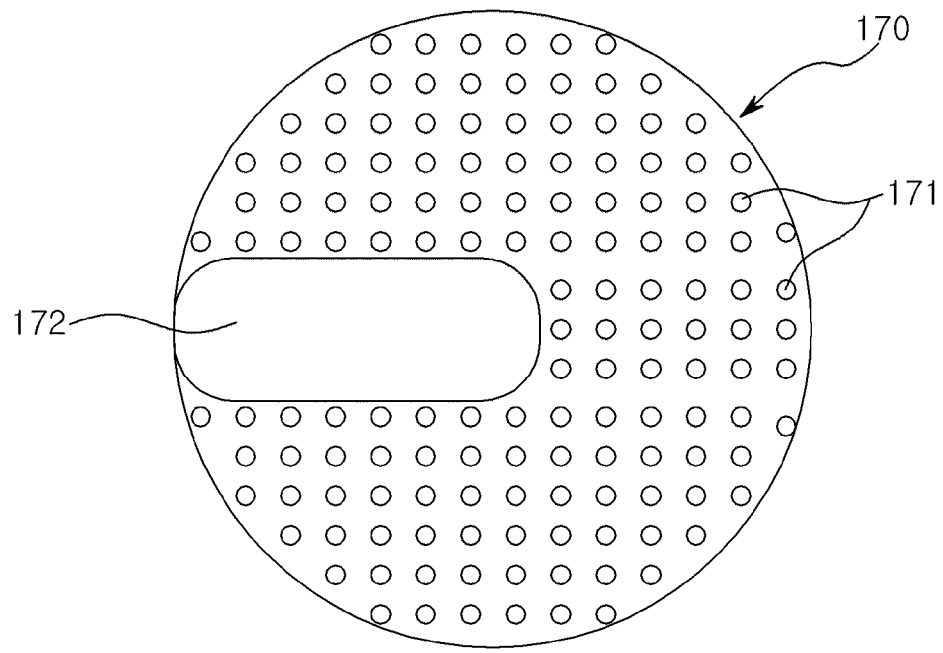
FIG. 4 is shows one of a plurality of dispersion plates included in the apparatus of FIG. 2.

FIG. 2 is a schematic lateral cross-sectional view of an apparatus for synthesizing CNTs according to an exemplary embodiment of the present invention. FIG. 3 is a schematic top cross-sectional view of the apparatus of FIG. 2. FIG. 4 is shows one of a plurality of dispersion plates 170 included in the apparatus of FIG. 2.

Referring to FIGS. 2 through 4, the apparatus according to the present embodiment includes a catalyst supplier 120, a gas supplier 130, a mixer 140, heaters 150, a collector 160, and the dispersion plates 170. The catalyst supplier 120 continuously supplies a catalyst into a vertical reaction chamber 110 from above the vertical reaction chamber 110. The gas supplier 130 supplies a source gas into the vertical reaction chamber 110 from above the vertical reaction chamber 110. The mixer 140 is disposed within the vertical reaction chamber 110 and mixes the catalyst supplied from above. The heaters 150 heat the vertical reaction chamber 110. The collector 160 is connected to a lower end of (?) the vertical reaction chamber 110 and collects CNTs that are synthesized. The dispersion plates 170 vertically partition the space inside the vertical reaction chamber 110 into a plurality of sections and uniformly disperse the source gas, which is supplied from above, into the sections.

The vertical reaction chamber 110 may be shaped like a furnace and may be made of quartz, graphite, or the like. The vertical reaction chamber 110 may include a gas exhaust unit (not shown) in a lower part thereof to exhaust gases remaining within the vertical reaction chamber 110 after a CNT synthesis process is performed.

The catalyst supplier 120 may include a fixed-amount supply unit (not shown) which continuously supplies a preset amount of catalyst from a storage tank into the vertical reaction chamber 110. Here, the storage tank is disposed adjacent to an upper part of the vertical reaction chamber 110. A catalyst may be a powder made of a transition metal (such as iron, platinum, cobalt, nickel, yttrium, or an alloy of the same) mixed with a porous substance (such as magnesium oxide, alumina, or silicon dioxide). Alternatively, the catalyst may be a liquid catalyst made of the above substances. When the catalyst is a liquid catalyst, the catalyst supplier 120 may include a storage tank which stores the catalyst, a supply line, a fixed-amount supply pump which is installed on the supply line, and a supply nozzle which sprays the liquid catalyst into the vertical reaction chamber 110.

The gas supplier 130 may include a gas supply unit which continuously sprays a preset amount of source gas into the vertical reaction chamber 110 from above the vertical reaction chamber 110. Here, the source gas may be at least one of acetylene, ethylene, methane, benzene, xylene, carbon monoxide, and carbon dioxide. The source gas is pyrolyzed into radicals, and the radicals react with a catalyst to synthesize CNTs.

The mixer 140 is disposed within the vertical reaction chamber 110. In order to mix a catalyst supplied from above, the mixer 140 includes a shaft 141, which is rotated by a driving member, and rotation plates 142 which are connected to the shaft 141.

The heaters 150 surround the outside of the vertical reaction chamber 110 to heat the vertical reaction chamber 110. The heaters 150 keep the vertical reaction chamber 110 at a temperature suitable for pyrolyzing a source gas. That is, the internal temperature of the vertical reaction chamber 110 may be maintained at, e.g., 700 to 1250° C., preferably, 900 to 1150° C.

The collector 160 is connected to the lower end of the vertical reaction chamber 110 and includes a collecting unit which collects CNTs that are synthesized. The collecting unit may be made of steel fiber or a quartz sheet.

The dispersion plates 170 included in the apparatus according to the present embodiment partition the space inside the vertical reaction chamber 110 into a plurality of sections. Each of the dispersion plates 170 includes a plurality of through-holes 171 through which a source gas passes and a catalyst-dropping hole 172. The catalyst-dropping hole 172 is shaped like an oval hole extending from the center of each of the dispersion plates 170, through which the shaft 141 of the mixer 140 penetrates, to an edge of each of the dispersion plates 170.

The dispersion plates 170 are alternately installed such that the catalyst-dropping holes 172 are at 180 degrees to each other. Thus, when a catalyst is supplied into a section, which is defined by one of the dispersion plates 171, from above the vertical reaction chamber 110, a corresponding one of the rotation plates 142 of the mixer 141 pushes the catalyst down to another section defined by another one of the dispersion plates 170. In this way, the catalyst is continuously supplied to all sections and increases the speed at which a pyrolyzed source gas is synthesized into CNTs.

The dispersion plates 170 may also be alternately installed such that the catalyst-dropping holes 172 are at 90 degrees to each other in a clockwise direction or a counter-clockwise direction, that is, in a direction corresponding to the direction in which the shaft 142 of the mixer 140 rotates. For example, the dispersion plates 170 may be alternately installed such that the catalyst-dropping holes 172 are at 90 to 180 degrees to each other Each of the dispersion plates 170 may include a plurality of catalyst-dropping holes which are at a predetermined angle to each other. That is, a pair of catalyst-dropping holes, which are at 180 degrees to each other, may be formed in each of the dispersion plates 170.

The catalyst-dropping hole 172 formed in each of the dispersion plates 170 can prevent channeling. That is, even when the through-holes 170, which disperse a source gas, are clogged, the source gas can still be supplied through the catalyst-dropping hole 172 to another section of the vertical reaction chamber 110 which is defined by each of the dispersion plates 170.

In order to prevent channeling, the dispersion plates 170 may be connected to a coolant inlet pipe (not shown) and a coolant outlet pipe (not shown) which pass through the space inside the vertical reaction chamber 110. Thus, coolant may flow into or out of each of the dispersion plates 170 through the coolant inlet pipe and the coolant outlet pipe to cool each of the dispersion plates 170, which are heated to a high temperature, and thus prevent a source gas from being pyrolyzed within the through-holes 171 of each of the dispersion plates 170.

As described above, an apparatus for synthesizing CNTs according to the present invention continuously supplies a catalyst and a source gas into a vertical reaction chamber by using a plurality of dispersion plates which vertically partition the space inside the vertical reaction chamber into a plurality of sections and uniformly disperse the source gas supplied from above the vertical reaction chamber into the vertical reaction chamber. Thus, the apparatus can continuously synthesize and collect CNTs.

The apparatus can continuously supply a catalyst, synthesize CNTs by using a source gas, and collect the synthesized CNTs. In addition, the apparatus can reduce the time required to supply a catalyst and synthesize and collect CNTs by controlling the rotation speed of a mixer and the amount of catalyst supplied. Consequently, productivity can be enhanced.

The apparatus continuously supplies a catalyst and synthesize and collect CNTs after setting conditions for performing a CNT synthesis process. Thus, the apparatus can provide CNTs with consistent quality.

Furthermore, a catalyst-dropping hole formed in each dispersion plate can prevent channeling which occurs when particles of a catalyst are very small.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. An apparatus for synthesizing carbon nanotubes (CNTs), the apparatus comprising:
   a vertical reaction chamber;
   a mixer which is disposed within the vertical reaction chamber and mixes a catalyst supplied from above; and
   a plurality of dispersion plates which vertically partition a space inside the vertical reaction chamber into a plurality of sections and uniformly disperse a source gas, which is supplied from above, into the sections.

2. The apparatus of claim 1, wherein each of the dispersion plates comprises a plurality of through-holes, through which the source gas passes, and a catalyst-dropping hole extending from a center thereof, through which a shaft of the mixer penetrates, to an edge thereof.

3. The apparatus of claim 2, wherein the dispersion plates are alternately installed such that the catalyst-dropping holes are at 180 degrees to each other within the vertical reaction chamber.

4. The apparatus of claim 2, wherein the dispersion plates are alternately installed such that the catalyst-dropping holes are at 90 degrees to each other within the vertical reaction chamber.

5. The apparatus of claim 2, wherein each of the dispersion plates comprises a plurality of catalyst-dropping holes which are at a predetermined angle to each other.

6. The apparatus of claim 1, further comprising:
   a catalyst supplier which continuously supplies a catalyst into the vertical reaction chamber from above the vertical reaction chamber; and
   a gas supplier which is supplies the source gas into the vertical reaction chamber from above the vertical reaction chamber.

7. The apparatus of claim 6, wherein the catalyst supplier comprises a fixed-amount supply unit which continuously supplies a preset amount of catalyst into the vertical reaction chamber from above the vertical reaction chamber.

8. The apparatus of claim 6, wherein the gas supplier comprises a gas supply unit which continuously sprays a preset amount of source gas into the vertical reaction chamber from above the vertical reaction chamber.

9. The apparatus of claim 1, further comprising:

heaters which are disposed outside the vertical reaction chamber and heat the vertical reaction chamber; and a collector which is connected to a lower end of the vertical reaction chamber and collects CNTs which are synthesized.

10. The apparatus of claim 1, wherein the dispersion plates are connected to a coolant inlet pipe and a coolant outlet pipe which pass through the space inside the vertical reaction chamber, and coolant flows in or out of each of the dispersion plates through the coolant inlet pipe and the coolant outlet pipe to cool each of the dispersion plates.

* * * * *